United States Patent
Rossell et al.

(10) Patent No.: US 9,908,323 B2
(45) Date of Patent: Mar. 6, 2018

(54) PRINTING SYSTEM CONTROL

(75) Inventors: Marti Rius Rossell, Sant Cugat del Valles (ES); Jordi Sender Beleta, Barcelona (ES); M. Isabel Borrell Bayona, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 252 days.

(21) Appl. No.: 14/413,615

(22) PCT Filed: Jul. 10, 2012

(86) PCT No.: PCT/EP2012/063518
§ 371 (c)(1),
(2), (4) Date: May 19, 2015

(87) PCT Pub. No.: WO2014/008933
PCT Pub. Date: Jan. 16, 2014

(65) Prior Publication Data
US 2015/0251411 A1    Sep. 10, 2015

(51) Int. Cl.
*H04N 1/60*    (2006.01)
*G06F 15/00*    (2006.01)
(Continued)

(52) U.S. Cl.
CPC ....... *B41J 2/04505* (2013.01); *B41J 2/04586* (2013.01); *B41J 3/543* (2013.01);
(Continued)

(58) Field of Classification Search
CPC .... B41J 2/04505; B41J 2/04586; B41J 3/543; B41J 11/46; H04N 1/00702;
(Continued)

(56) References Cited

U.S. PATENT DOCUMENTS

| | | |
|---|---|---|
| 4,721,969 A | 1/1988 | Asano |
| 5,534,895 A | 7/1996 | Lindenfelser et al. |

(Continued)

FOREIGN PATENT DOCUMENTS

| | | |
|---|---|---|
| EP | 0729846 A2 | 4/1996 |
| JP | 59230768 | 12/1984 |

(Continued)

OTHER PUBLICATIONS

Liou, Jian-Chiun et al., "An intelligent high-speed 3D data registration integrated circuit applied to large array format inkjet printhead", Proceedings of the 1st IEEE Conference on Nano/Micro Engineered and Molecular Systems, Jan. 18-21, 2006, Zhuhai, China, 5 pp.

(Continued)

*Primary Examiner* — Quang N Vo
(74) *Attorney, Agent, or Firm* — HP Inc. Patent Department

(57) ABSTRACT

A method and system of controlling at least one printbar in a printing system are described. The printing system has one or more of printbars (160, 190) distributed along a media transport. A first image including a reference pattern (240A, 240B) is generated on a print medium (150) with a first printbar (160). A detector (180) then detects a pattern on the print medium. The reference pattern and the detected pattern are used to determine a position of the first image relative to a second printbar (190). This position is used to configure nozzle data for a second image to be generated on the print medium by the second printbar.

15 Claims, 6 Drawing Sheets

(51) Int. Cl.
*G06K 1/00* (2006.01)
*B41J 2/045* (2006.01)
*B41J 11/46* (2006.01)
*H04N 1/047* (2006.01)
*B41J 3/54* (2006.01)
*H04N 1/00* (2006.01)
*H04N 1/12* (2006.01)
*H04N 1/191* (2006.01)

(52) U.S. Cl.
CPC .......... *B41J 11/46* (2013.01); *H04N 1/00702* (2013.01); *H04N 1/00774* (2013.01); *H04N 1/047* (2013.01); *H04N 1/12* (2013.01); *H04N 1/191* (2013.01); *H04N 2201/0082* (2013.01); *H04N 2201/04713* (2013.01); *H04N 2201/04717* (2013.01); *H04N 2201/04729* (2013.01); *H04N 2201/04731* (2013.01); *H04N 2201/04734* (2013.01); *H04N 2201/04743* (2013.01); *H04N 2201/04781* (2013.01); *H04N 2201/04786* (2013.01); *H04N 2201/04787* (2013.01); *H04N 2201/04789* (2013.01); *H04N 2201/04791* (2013.01)

(58) Field of Classification Search
CPC ...... H04N 1/00774; H04N 1/047; H04N 1/12; H04N 1/191; H04N 2201/0082; H04N 2201/04713; H04N 2201/04717; H04N 2201/04729; H04N 2201/04731; H04N 2201/04734; H04N 2201/04743; H04N 2201/04781; H04N 2201/04786; H04N 2201/04787; H04N 2201/04789; H04N 2201/04791
USPC .......................... 358/1.9, 3.06, 1.2; 382/284
See application file for complete search history.

(56) References Cited

U.S. PATENT DOCUMENTS

| 5,568,172 | A | 10/1996 | Cowger |
| 5,992,973 | A | 11/1999 | Wen |
| 2008/0278735 | A1 | 11/2008 | Wang et al. |
| 2011/0273502 | A1 | 11/2011 | Eun et al. |
| 2011/0279504 | A1 | 11/2011 | Mizes |
| 2013/0201233 | A1* | 8/2013 | Zhang et al. .................. 347/10 |

FOREIGN PATENT DOCUMENTS

| JP | 2005035082 | | 2/2005 |
| WO | 2006046249 | A1 | 5/2006 |
| WO | 2014008933 | A1 | 1/2014 |

OTHER PUBLICATIONS

International Search Report and Written Opinion for PCT/EP2012/063518 dated Oct. 19, 2012, 15 pp.

* cited by examiner

PRINTING SYSTEM CONTROL

BACKGROUND

Page-wide array printers typically use one or more printbars to print a composite image on a print medium. In an ink-jet printer, a printbar may comprise one or more printheads with a plurality of nozzles to eject liquid ink onto a print medium. Ink is ejected from each nozzle using a transducer. In a thermal ink-jet printer, the transducer comprises a nozzle resister; in other ink-jet printers the transducer may comprise a piezoelectric element. Continuous ink-jet printing is also possible, wherein ejected ink is directed onto a print medium using an electro-magnetic field. In most cases, the ejection of ink by a transducer is controlled by a voltage signal, sometimes referred to as a firing signal. The firing signal is generated by a print controller or print engine based on image data associated with a print job, i.e. an image to be printed. Commonly, the one or more printbars are mounted above a media transport that transports a print medium along a path under the one or more printbars. In these cases, ink is ejected across a gap formed below the one or more printbars and is deposited on to the print medium carried by the media transport. The locations where ejected ink drops land on the print medium are sometimes called "ink drop locations," "ink drop positions," or "printed pixels".

The use of one or more printbars provides a number of advantages, such as redundancy in a number of nozzles covering a given area, cancellation of ink-drop weight non-uniformities, and reduced ink-flux per printbar. Nevertheless, printing systems with one or more printbars that print multiple images may in some circumstances present registration problems between the images. For example, to print an image of a print job, a first printbar may print a first image or image component on a print medium and a second printbar may print a second image or image component on the same print medium. As a combination of the first and second image produce a composite image representing the image of the print job, it is important that the first and second images are properly aligned on the print medium. In this context, registration is the process of ensuring that the image components of an image to be printed are located on the print medium so as to generate the correct composite image. For example, in certain cases each printbar may print a separate colour component of the set of cyan, magenta, yellow and black (CMYK). These colour components may be printed on top of each other to provide particular resultant colours; if the colour components are not properly aligned a poor quality final image is produced.

Registration may be based on the readings of encoders attached to a mechanical element of a media transport such as a media roller, a drum, or a belt. These encoders convert a position of the mechanical element into an electronic signal. For example, an electric motor that drives an endless belt system or a printer drum may comprise a rotary encoder that outputs an electronic signal representative of the rotation of the motor. In this case, the output electronic signal is used to infer the position of a print medium carried by the endless belt system or printer drum.

While existing solutions enable image components printed in a printbar system to be registered, they may still produce registration errors. These errors lead to poor image quality. It is also difficult to properly align image components without complex and expensive registration systems. These registration systems may be difficult to scale to larger printing systems.

BRIEF DESCRIPTION OF THE DRAWINGS

Various features and advantages of the examples described herein will be apparent from the detailed description which follows, taken in conjunction with the accompanying drawings, which together illustrate, by way of example only, features of the present disclosure, and wherein.

DETAILED DESCRIPTION

Figure 1:
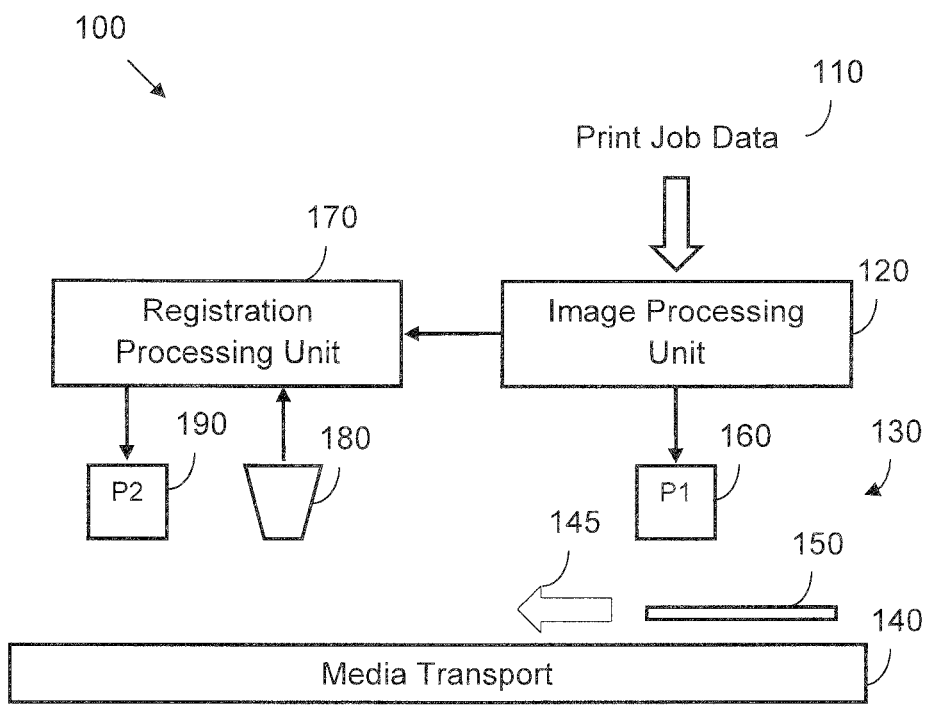
FIG. 1 is a schematic diagram of a printing device according to an example.

Examples of a method and a printing device are described. Certain examples alleviate or overcome problems experienced with existing registration systems. Certain examples involve the printing of a first image on a print medium, wherein the first image comprises a predetermined reference pattern. The predetermined reference pattern may be a sparse, pseudo-random dot pattern. After printing, a pattern is detected on the print medium. This may be achieved using an image sensor. The detected pattern and the reference pattern are then used to configure nozzle data for the printing of a second image. This may be nozzle firing data and/or other printing data. The configuration acts to register the second image with the first image. The detected pattern and the reference pattern may be compared and/or correlated to determine a position of the first image on the print medium relative to a printbar that is to print the second image.

Certain examples described herein have an advantage of being robust against expansion of print media. Ink typically comprises pigment, solvent and other chemicals to optimise ink properties. As the pigment is dissolved in the solvent, which effectively transports the colourant, the solvent is referred to as a 'vehicle' for the pigment. Depending on the type of ink to be used, the solvent may comprise one or more of oil, water and other materials. In the case of thermal inkjet printer, the vehicle typically comprises a high proportion of water and so is referred to as a 'water vehicle'. In these cases, the properties of the ink will be similar to water. In printbar systems, media typically expands after being printed by a printbar because the water vehicle relaxes fibres in the print media. This is especially the case with paper media. When this occurs the print media is likely to detach from the media transport. As a consequence, encoder readings based on encoders attached to mechanical elements of a media transport are no longer accurate. This may lead to misalignment of printed images and poor quality image output. In contrast, certain ones of the described examples are inherently insensitive to media expansion because the registration marks are effectively placed on and read from the printing substrate during a printing operation. Additionally, methods that use a pseudo-random dot pattern enable an accurate calculation of any media movement by correlating a reference and detected pattern.

Image registration problems can be also caused by media slippage or by mechanical imperfections of the said mechanical elements to which an encoder is attached. For example, in certain comparative printing systems that use a vacuum drum, it has been found that the vacuum may not be enough to prevent media slippage due to media expansion. Certain described examples avoid these problems by placing a registration pattern on a print medium along with a first image, and then using a detected image of this registration pattern to configure nozzle data for a second image. This effectively registers the first and second images.

Certain described examples are also less complex than other registration systems. For example, certain comparative printing systems use measurements of belt movement, the belt forming part of a media transport system. However, it has been found that these systems require complex calibration to accommodate variations in belt thickness (e.g. due to different advance ratios along its period due to different thicknesses). These systems are difficult to scale to larger printing systems such as those with multiple parallel belts. Certain examples described herein, on the other hand, may be used with multiple parallel belts.

Certain described examples also provide advantages over comparative registration systems that use optical media sensors. For example, one comparative registration system in a carriage-based desktop printing system tracks the movement of media fibres on the back of a substrate with an image sensor located underneath a path of a print medium. These comparative registration systems are often difficult to implement with a page-wide array printer. A page-wide array printer often lacks space underneath a path of a print medium to mount the comparative image sensor. Moreover, the comparative image sensor is designed to capture images of small-sized (e.g. A4 or less) print media carried by a low-speed, and often inclined, media transport. The comparative image sensor is also incapable of detecting media rotation. Hence, a completely redesigned image sensor would be required for the larger media sizes and different media transport arrangements used in large-scale, page-wide printbar systems.

An example of a printing system 100 is shown in FIG. 1. FIG. 1 is a schematic diagram, as such certain components have been omitted to facilitate a description of the example and actual implementations may vary in practice. In the printing system 100, print job data 110 is received by an image processing unit 120. The print job data 110 may comprise image and/or control data associated with a document to be printed, e.g. one or more data files representing an image comprising a plurality of pixel values. It may be generated by a print workflow manager (not shown) on receipt of a new print job from a user of a computer system. It may comprise digital and/or analog data. The image processing unit 120 processes the print job data 110 in order to print an image from one or more printbars 130.

In the example of FIG. 1, the one or more printbars 130 laterally extend across a media transport 140. This is shown more clearly in FIG. 2A. The printing system is sometimes referred to as a 'page-wide' array printer, as an array of one or more printbars 130 laterally extend across a page width of a print medium 150. The media transport 130 carries a print medium 150 in a process direction, i.e. along a print path 145 underneath the one or more printbars 130. The media transport 140 may comprise any suitable transport technology, for example those utilising one or more rollers, drums and/or belts. Any suitable form of print media may be used, including, amongst others, single media sheets and/or continuous rolls; however, for ease of explanation reference will be made to a single print medium in the examples. The print media may comprise any suitable substrate such as, amongst others, plain paper, glossy paper, coated paper, transparencies, polymers, metal foils etc. Any suitable method may be used to retain print media upon the media transport 140, such as a vacuum system. Indeed, an advantage of the described example is that it is independent of the type of media transport 140 that is used. It should be noted that for clarity the example of FIG. 1 is shown as a linear system, however other orientations, such cyclical configurations based on 'endless belt' systems may alternatively be used. In these latter cases, a single printbar may be used to print different images with each pass of a print medium. These are sometimes referred to as multipass printing systems. A similar configuration may also be used wherein the media transport oscillates a print medium in and out of the path of a printbar.

Each printbar 130 comprises one or more printheads that in turn comprise a plurality of nozzles for ejecting ink onto a surface of a print medium 150 carried by media transport 140. In certain implementations, each printhead may have a printhead controller that receives data from the image processing unit 120. The example of FIG. 1 shows a plurality of static printbars but the example could equally be applied to one or more moveably-mounted printbars and/or printheads. The nozzles may be used to eject ink under the action of a transducer such as, amongst others, a nozzle resistor or piezoelectric element. Data configured to activate such a transducer will be referred to herein as 'firing data'. Firing data may also comprise any higher-level data that is translated or converted into data configured to activate a transducer, for example data provided to a printhead controller. Nozzle data, as discussed herein, may comprise firing data and/or any other configuration data that is used to control how ink is ejected from the nozzles of a printbar.

In the example of FIG. 1, the image processing unit 120 is arranged to add a reference pattern to a first image to be printed by a first printbar 160. For example, the print job data 110 may comprise an image and/or document to be printed that is converted by the image processing unit 120 into a first image to be printed by the first printbar 160. The first image may comprise a particular colour separation for a composite image or may comprise particular portions of a final image to be printed. The reference pattern may be retrieved from memory, for example, as a predetermined series of nozzle activations, or may be generated at the time of printing based on a predetermined set of operations. For example, in the latter case, a predetermined set of operations may define parameters for a pseudo-random dot pattern, wherein the actual printed dot pattern differs for different printing operations. A combination of methods is also possible. In any case, the image processing unit 120 generates data for printing the first image by the first printbar 160, which may comprise nozzle firing data for the first printbar 160.

As part of a printing operation, the print medium 150 is driven along the print path 145 by the media transport 140. Downstream from the first printbar 160 in the process direction is located a detector 180 for detecting a pattern printed on the print medium 150. The detector 180 may comprise an image sensor, such as a charge-coupled device (CCD) or a contact image sensor (CIS). The detector 180 may laterally extend along the width of the print medium 150 and/or the media transport 140, i.e. in a direction perpendicular to the process direction, or extend across one or more portions of print medium 150 and/or the media transport 140. The detector 180 may be a scanline scanner arranged to capture one or more scanlines of a print medium 150 passing a scanhead so as to generate an image of the print medium 150. The detector 180 may be attached to a second printbar 190, or located within a predetermined distance of the second printbar 190 (e.g. upstream or downstream in the process direction). In multipass systems with a single printbar, the detector 180 may be coupled to the single printbar to detect a pattern on a subsequent pass of a print medium.

In the example of FIG. 1, data collected by the detector 180 is sent to a registration processing unit 170. The data collected by the detector 180 may comprise image data featuring a captured image of the predetermined reference as printed on the print medium 150 by the first printbar 160. In certain implementations, the image processing unit 120 forms part of the printer control circuitry with registration processing unit 170. This control circuitry, or various functional sub-elements, may be referred to as a print engine or print controller. In the example of FIG. 1, the image processing unit 120 sends the registration processing unit 170 data representative of the reference pattern. In general, the reference pattern is made accessible to the registration processing unit 170; this need not be in the form of a direct coupling but may also include, amongst others, accessing the reference pattern from memory or a common bus. For example, in certain implementations, both the image processing unit 120 and the registration processing unit 170 may be implemented by a common set of one or more processors, in which case a process performing the functionality of the registration processing unit 170 is given access to the reference pattern as generated by a process performing the function of the image processing unit 120. In other examples, the reference pattern may be accessible to both the image processing unit 120 and registration processing unit 170. In any case, the registration processing unit 170 uses data received from the detector 180, together with data representative of the reference pattern, to determine the relative positioning of the reference pattern, and hence the first image, with respect to the second printbar 190. In the example of FIG. 1, the relative positioning is then used to synchronise the firing of nozzles mounted upon the second printbar 190 based on the relative positioning of the first image in relation to the second printbar 190. In multipass examples, the 'second printbar' may comprise a single printbar that has been used to print a first image, wherein this single printbar has a second configuration that allows it to print a second image, e.g. it becomes a 'virtual' second printbar. In any case, the operation of the registration processing unit 170 allows the second printbar 190 to be controlled by means of registration information, so that the complementary images printed by the first and second printbars 130 are properly registered.

Figure 2A:
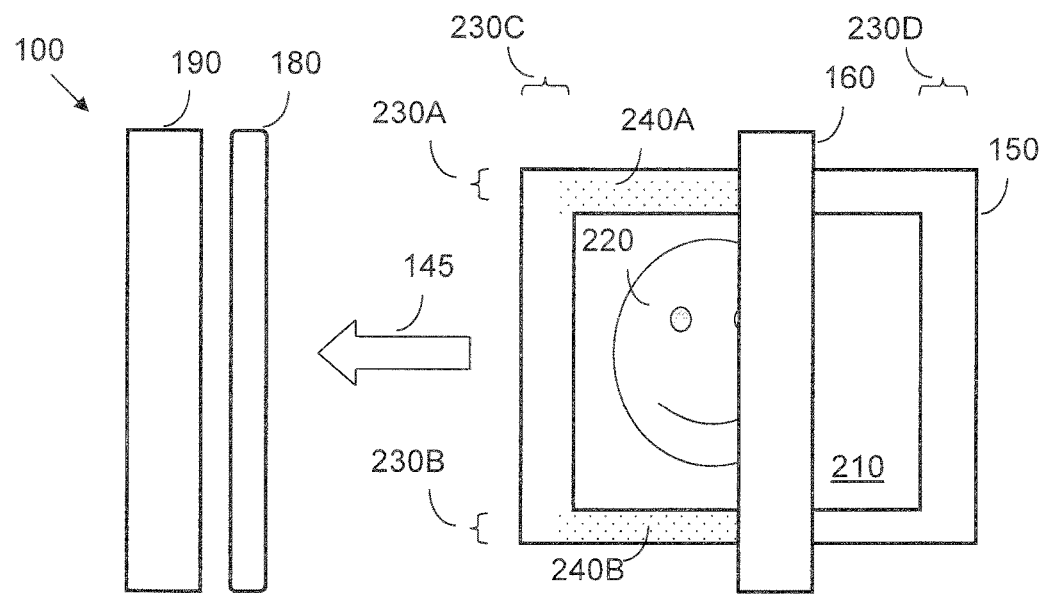
FIG. 2A is a schematic diagram of the printing device of FIG. 1, viewed from above during a printing operation
Figure 2B:
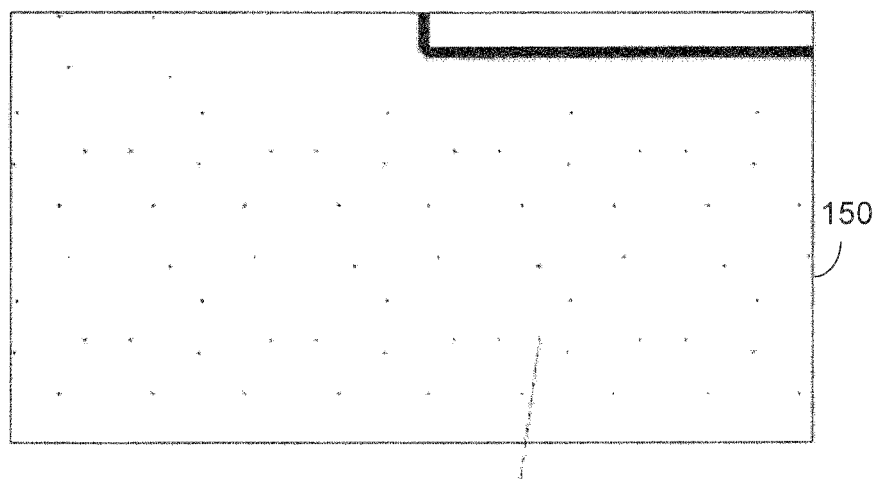
FIG. 2B is a magnified view of an area of a print medium shown in FIG. 2A.

FIG. 2A shows an exemplary top view of the printing system 100 shown in FIG. 1. The Figure shows a print medium 150, in this example a sheet of paper media, passing underneath the first printbar 160 wherein a first image is printed on the print medium 150. In FIG. 2A, the first image comprises a main image area 210 where an image or document to be printed 220 is to be placed. The main image area 210 is surrounded by four margins: a first lateral margin 230A, a second lateral margin 230B, a front margin 230C and a rear margin 230D. In this description the margins are defined with reference to the process direction or path 145 of the print medium. In the example shown in FIG. 2A, the reference pattern is printed in the two lateral margins 230A and 230B. As will be described below, this is one of a number of configurations for the reference pattern. In FIG. 2A the reference pattern comprises a pseudo-random pattern of dots 240—a first set of dots 240A is printed in the first lateral margin 230A and a second set of dots is printed in the second lateral margin 240A. In this context, pseudo-random is a term used to describe the appearance of the dots. In certain examples, an objective is to minimise visibility of the reference pattern—as such they are configured to appear random so as to avoid patterns or dot clusters that may be detected by a human observer. A more detailed view of the pseudo-random pattern of dots 240 is shown in FIG. 2B. Each dot is generated by printing a predefined quantity of ink from a nozzle of a printhead in the first printbar 160. In certain examples a dot may be generated using one or more nozzles. The pattern is sparse, for example 50 dots per square inch per colour. However, the dot density may be set depending on implementation, for example depending on a print quality or a printer type (e.g. photographic, Computer-Aided-Design, professional etc).

In certain implementations a reference pattern, such as the dot patterns 240, may be generated based on a pattern used for a nozzle cleaning operation. For example, certain printing systems randomly or pseudo-randomly activate printing nozzles as part of a cleaning operation, for example to shift or 'purge' any built-up ink sediment and to ensure continued or 'healthy' operation of the nozzles. These cleaning operations are sometimes referred to as "spit-on-page" operations, as the nozzles are made to 'spit' ink onto a print medium. In certain cases, the patterns used for the nozzle cleaning operation are generated by computer program code that implements rules for distributing dots in a manner that minimises their visibility on a print medium. In certain cases, multiple patterns are tested for visibility using human users and the least visible pattern is then selected and stored as a fixed routine, e.g. a list of nozzles to activate to generate the pattern. This computer program code and/or fixed routines may be used by the present examples. By basing the reference pattern of a "spit-on-page" pattern, for example by reusing circuitry, components and/or routines used to create "spit-on-page" patterns for a nozzle cleaning operation, cost and/or space savings may be made.

Returning to FIG. 2A, following the printing of an image or document 220 in the main image area 210, together with the printing of dot pattern 240 in the lateral margins 230A, 230B, the print medium continues along the path 145 on the media transport. After a time the print medium 150 of FIG. 2A passes under detector 180. The detector 180 captures an image of the print medium, which includes an image of the printed reference pattern and, in certain cases, the printed first image. The print medium 150 carries on along the path 145 until it passes under the second printbar 190. The second printbar 190 then prints a second image on the print medium 150 that has been registered with the first image based on at least the image of the printed reference pattern captured by the detector 180. In certain examples, the image of the printed reference pattern captured by the detector 180 may be compared with data representative of the original reference pattern to determine a misalignment of the first image and the second printbar 190, i.e. a position of the first image relative to the second printbar 190.

Figure 3:
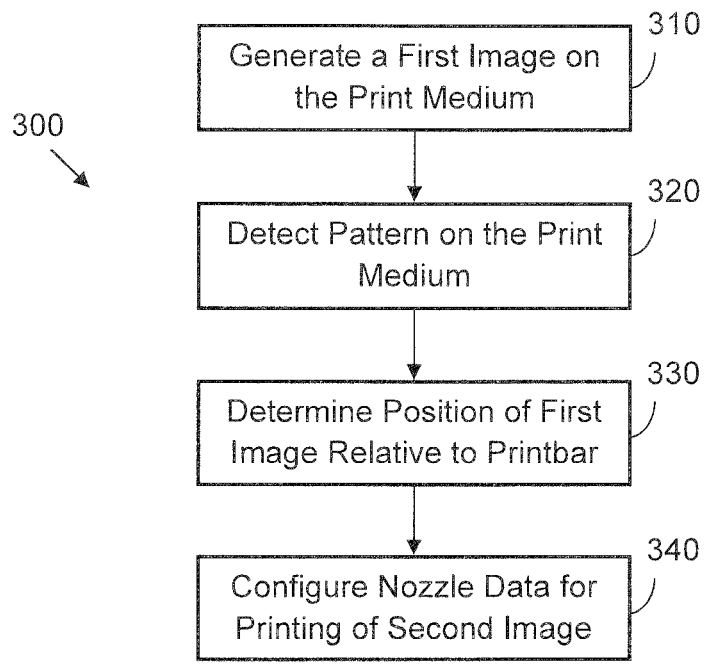
FIG. 3 is a flow diagram of a method of controlling a printing device according to an example.

FIG. 3 is a flow diagram showing an exemplary method 300 of controlling a second printbar relative to a first printbar. It will now be described with reference to the printing system 100, although in practice it may be implemented using alternative printing systems, including a multipass system with a single printbar that is used as both the first and second printbar described herein. At block 310, as described above, a first image is printed on a print medium using a first printbar, such as first printbar 160. The first printbar is located at a first position along a path of the print medium. The first image includes a reference pattern, which may be predetermined and/or dynamically generated. At block 320, the reference pattern, as printed on the print medium is detected. This may be performed by detector 180. In some examples, the detected pattern may comprise one or more scanlines of at least a portion of the print medium. In some examples, block 320 may comprise performing additional image processing on a captured image to generate data representative of the detected pattern. At block 330, a position of the first image, as printed on the print medium, relative to a second printbar is determined. This determination may use blocks similar to those shown in FIG. 4 or other image or geometric processing that enables an alignment of the first image on the print medium and the second printbar to be calculated. In a multipass system, the position of the first image with respect to a printbar operating as a second printbar is determined. The determination is made based on the detected pattern and the original reference pattern. At block 340, nozzle data for the printing of the second image by the second printbar is configured based on the determined position of the first image relative to the second printbar. This may comprise generating appropriate firing data for print job image data received from the image processing unit 120 or correcting pre-existing firing data to accommodate any shift in the position of the first image from an assumed reference position.

Figure 4:
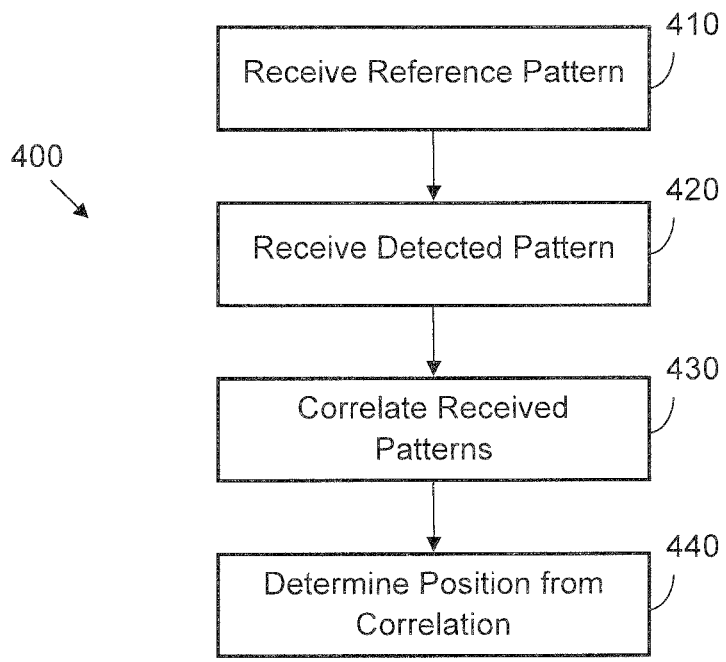
FIG. 4 is a flow diagram of a method of determining a position of a first image relative to a printbar according to an example.

FIG. 4 is a flow diagram showing an exemplary set of blocks 400 that may be applied as part of block 330 in FIG. 3 in certain implementations. In other implementations, blocks other than those shown in FIG. 4 may be used. The blocks 400 may be performed by registration processing unit 170. At block 410 a reference pattern is received. As shown in FIG. 1, this may comprise receiving data representative of the pattern that was printed by the first printbar 160 from the image processing unit 120. This data may comprise an image representation or a mathematical representation, e.g. a representation defining a distribution of nozzle ejections. In certain examples, the reference pattern may comprise an emulation of a printed output, i.e. may be a virtual image representative of a printed output of the first printbar 160 based on data supplied from the image processing unit 120. A virtual image in this manner may be generated to match the output of the detector, e.g. to take into account the resolutions of the printing system 100 and/or the detector 180. It may also be further processed to take into account characteristics of the detector 180, for example a scanner field-of-view may be taken into account such that dots of a reference pattern in a virtual image are comparable with an expected printed output. An example of a virtual image is described in more detail below with reference to FIGS. 7A and 7B.

Figure 5:
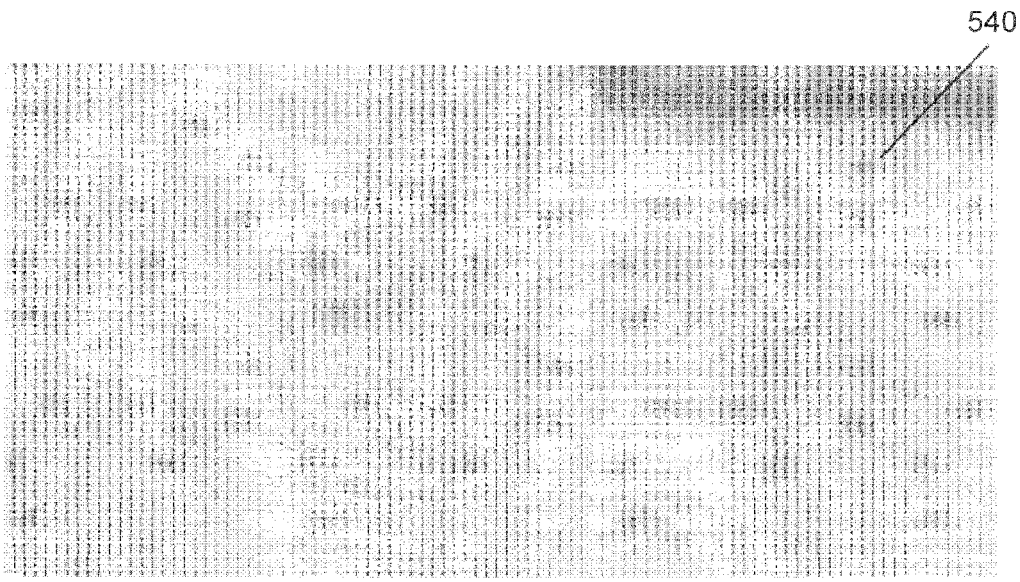
FIG. 5 is a representation of a detected pattern according to an example.
Figure 6:
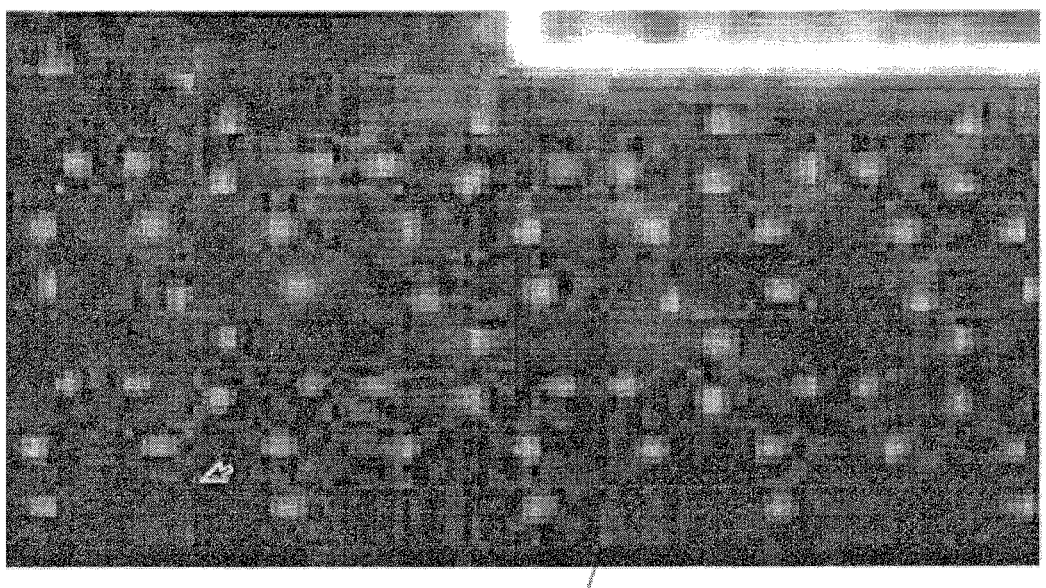
FIG. 6 is a representation of a detected pattern following image processing according to an example.

At block 420, a detected pattern is received. This may be received by the registration processing unit 170 from the detector 180. FIG. 5 shows a pattern 540 as detected by an exemplary detector 180. In this example, an image is captured at 600 dpi (dots per square inch) by a low-cost CIS. FIG. 6 shows a version of pattern 540 following standard image processing to adjust polarity and contrast. Image processing may be applied as needed depending on the colour printed, resolution, scanner quality, distance from media etc. For example, when printing yellow dots in a white space of an image, image processing may be required to enhance the detected pattern. The detected pattern 640 is clearly visible in FIG. 6; however, machine-based routines may be better able to accommodate noisy detector data. At block 430, the reference pattern and the detected pattern are compared. This may comprise correlating data representative of the reference pattern and data representative of the detected pattern. The data representative of each pattern may comprise for example, grayscale and/or quantised pixel values arranged in one or two-dimensional data arrays. These data arrays may be correlated and the results of the correlation used to determine the position of the first image with respect to the detector 180. If the detector 180 has a known geometric relationship with the second printbar 190, for example is mounted at a first location relative to the second printbar, then the position of the first image with respect to the second printbar can be determined. This is shown in step 440. In certain cases, the detector 180 may be mounted on the second printbar, such that a pattern is detected at the second printbar.

For example, any variance from a perfect correlation between the reference pattern and the detected pattern (e.g. a correlation coefficient not equal to 1) may be used to determine one or more of: a movement in one or more dimensions (x, y, z) and a rotation about a reference axis (roll, pitch, yaw). For example, this may be: a shift in the process direction, a shift perpendicular to the process direction, a shift perpendicular to a plane in which the print media is carried by the media transport, a rotation about an axis parallel with the process direction (roll), a rotation about an axis perpendicular to the process direction but in the general plane of the print media (pitch) and/or a rotation about an axis perpendicular to the general plane of the print media (yaw). The variance may be calculated for a particular dimension and/or axis of rotation. Any movement and/or rotation is then used to control the nozzles on the second printbar. Different sets of nozzles may be selected to perform a correction, as well as, or instead of, a correction to nozzle timing data. In a laterally extending array, different sets of nozzles may be activated to correct rotation of a print medium or shift an image in a crossweb direction, i.e. direction perpendicular to the process direction.

In one example, after data representative of the reference pattern and data representative of the detected pattern have been correlated, a distance between a detected pattern (i.e. a detected pattern that was printed with the first printbar) and a 'theoretical' or 'virtual' pattern is calculated. The 'theoretical' or 'virtual' pattern represents a simulated output according to a model, for example if the print medium was to advance without errors and if there was no media expansion. Correlation calculations may be performed for one or more axes, for example a process direction or media advance axis and a process-perpendicular or printbar axis, to produce distances for said one or more axes. For correction in relation to a media advance axis, the data sent to the nozzles may be adjusted by applying delays to firing data such as the firing pulse. For correction in relation to a printbar axis image data may be modified so as to modify the resultant nozzle data sent to the nozzles, for example the content of an image may be displaced by shifting the image by the calculated distance in the printbar axis A number of variants of the described examples will now be described. These variants may be combined as appropriate for the implementation. The example of FIG. 2A shows a reference pattern that is printed in one or more lateral margins on a print medium. In a first variant, which may be for use in a borderless printing system in which lateral margins are absent, the reference pattern is alternatively placed in a front margin 230C. In such a case, an image registration procedure, for example the blocks of FIG. 3, is performed at a beginning of a print job. This ensures that at least the front edge of an image to be printed 220 is correctly registered. In certain cases, conventional encoder information, such as that associated with one or more mechanical elements, may be used to complement the registration achieved using the described examples. For example, in these cases conventional encoder information may be used to ensure that elements of a print-job image distributed along a print medium in the process direction maintain alignment.

In a second variant, non-printed areas within an image to be printed 220 are detected and used to determine the position of the reference pattern on the print medium. This may be performed, for example, using one or more available densitometers that form part of control circuitry such as application-specific integrated circuits (ASICs) forming part of a printing pipeline that includes print job data 110. In these cases, a reference pattern may be selected that is invisible to the naked eye when printed, or at least has a visibility below a measurable threshold. For example, particular pseudo-random sparse patterns may be printed with certain colours that are difficult to discern from a colouring of a print medium. For example, a sparse pseudo-random pattern of yellow dots comprising the output of particular nozzles may have a visibility below a particular threshold for a white or near white print medium. Hence, if non-printed areas within an image to be printed are detected, they may be used as a location to print an invisible dot pattern. This further allows correction to be applied as a continuous image is printed, i.e. two non-printed areas at different locations in a process direction and/or a cross-media direction may be used. Alternatively, non-print areas may comprise areas of a print medium that are not used in a final printed product, for example areas that are cut out, removed or pasted over.

In a third variant, the reference pattern comprises at least a portion of an image to be printed. For example, based on pre-print image processing, a particular portion of the image to be printed is identified. This may comprise a portion that is particularly distinctive, e.g. based on one or more statistical metrics. A synthetic or virtual image based on the image to be printed, or at least a portion of it, is then generated based on data sent to the first printbar 160. In this case, the detector 180 comprises an image sensor for obtaining an image of at least an area of the print medium where the distinctive portion of the image is located. The synthetic image and the detected image are then correlated to obtain the relative positioning therebetween, e.g. the relative positioning of print image portions relative to the detector 180 and by extension the second printbar.

Figure 7A:
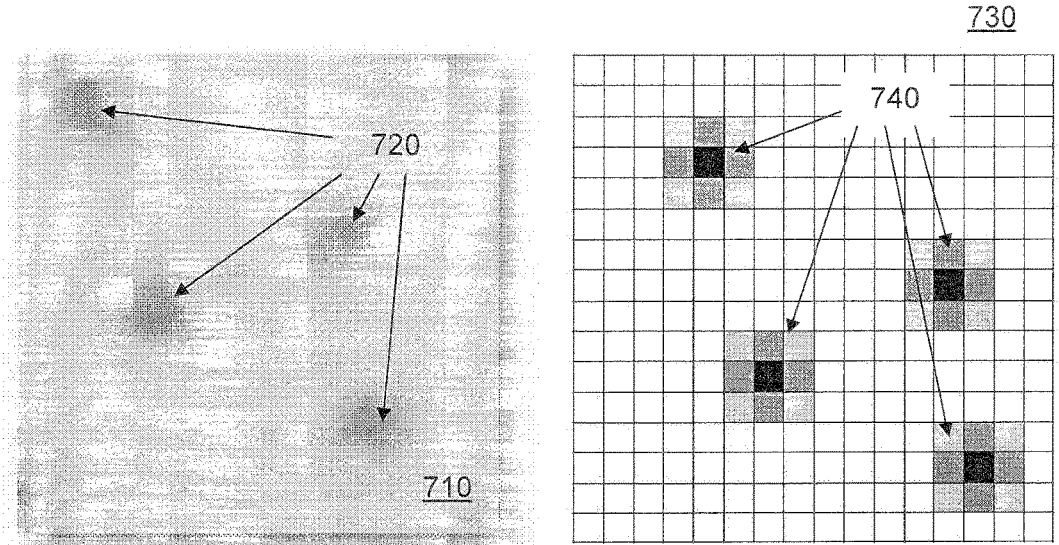
FIG. 7A is an illustration of a detected pattern according to an example and a reference pattern.
Figure 7B:
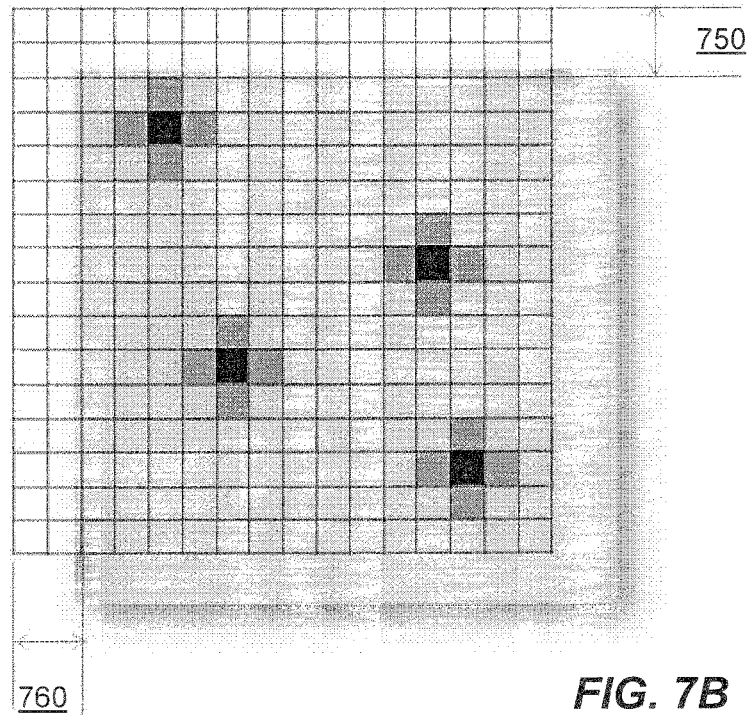
FIG. 7B is an illustration showing a registration error between the detected pattern and the reference pattern of FIG. 7A.

FIGS. 7A and 7B demonstrate how correlation may be performed between a detected pattern and a reference pattern. They will now be described as the concepts may be applied to the third variations, as well as other examples described herein.

In certain examples, correlation is performed by multiplying, pixel by pixel, information or data representing two images. Different results are produced dependent on a measure of similarity between the two images. For two-dimensional images a shift in the x-direction and/or a shift of the y-direction of one of the images relative to the other image may be detected by correlating the two images a plurality of times with one of the images shifted in the x and/or y direction; in these cases, a correlation metric for each shifting operation is determined and a maximum value of this metric corresponds to a most-likely (i.e. actual) shift.

In relation to the present examples, one of the above described images is an image obtained using the detector 180. The other image is produced from what a user sends to the printing device. An image sent to the printing device may be at a different resolution to the detected image. Likewise, the pixels of the two images, even when perfectly aligned are likely to have different data values. Therefore as a first processing operation one or more of the detected image and an image to be printed are modified such that they are at the same resolution. This may involve up or down sampling, with or without interpolation. As a next processing operation an image to be printed is transformed to be representative of a printed output. For example, an active pixel in an image will produce the ejection of a drop of ink. This drop of ink, when applied for example to a paper medium, will produce a dot that is different in size from a digital pixel. Hence, a transformation may be performed on digital pixels of an image to be printed such that they represent a dot on paper. This transformed image with an adjusted resolution is referred to as virtual or synthetic image.

FIG. 7A shows an example of a detected pattern 710 formed from printing four pixels. The four pixels produce four dots 720 on a print medium that have a particular form when detected by a detector, as shown in the Figure. FIG. 7A also shows a virtual or synthetic image 730 for the same four pixels. As can be seen the resolutions of one or more of the two images have been adjusted to match based on a first processing operation. Additionally, following a second processing operation, each pixel 740 now has a blurred form, similar to the result of the application of a Gaussian filter. As the two images are comparable they can be correlated. FIG. 7B shows a result of a correlation operation. As can be seen the synthetic image 730 is shifted by a first distance 750 in the y-direction and a second distance 760 in the x-direction. These distances may then be used to adjust nozzle data for a printbar. Even though FIGS. 7A and 7B show a dot pattern, the procedures may also be applied to identified distinctive elements of an image in the third variation.

Figure 8:
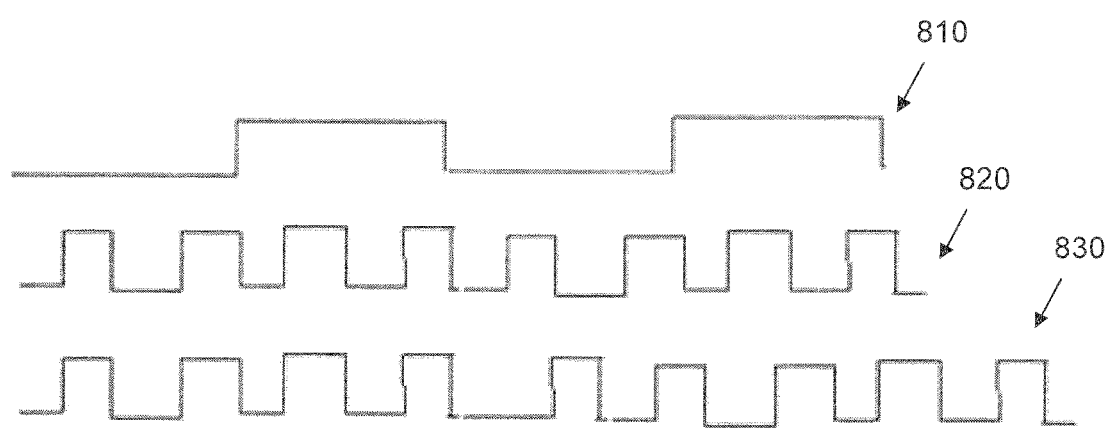
FIG. 8 is an example of a set of encoder signals and firing pulses.

Variations, as described below, are also envisaged for blocks 330 and/or 340 of FIG. 3. In a fourth variant, registration processing unit 170 generates a virtual encoder signal that directly regulates the firing of nozzles mounted upon the second printbar 190. For example, the printing system may wait for certain pattern combinations to be detected in data returned from the detector 180, then generate a sequence of encoder signals that runs until another known pattern combination is detected, which in turn triggers another sequence of encoder signals. This is shown in FIG. 8. An encoder signal 810 and a set of firing pulses 820 are shown. The encoder signal 810 may be representative of a rotating mechanical element, e.g. comprise a periodic square-wave signal. The encoder signal 810 may be used to add a programmed delay to the firing pulses, as is shown in signal 830. In a fifth variant, one or more encoders attached to one or more mechanical elements are used. In this case, registration information is generated by the registration processing unit 170 based on one or more patterns detected by detector 180. This registration information is representative of a misalignment of the first image relative to the second printbar and is used to correct the timing of the one or more encoders. The corrected timings of the one or more encoders are then used to control nozzle data, e.g. to control or synchronise the firing of nozzles on the second printbar.

Depending on the implementation there may also be variations in how information from different reference patterns is used. In one case, data representative of the patterns detected in both lateral margins is averaged to generate a virtual encoder (i.e. a virtual encoder signal) that is accurate at a central axis of the print medium, e.g. an axis of rotation perpendicular to the plane of the print medium located in the centre of the print medium. In another case, the difference between patterns detected in different lateral margins may used to determine the media rotation. For example, a first set of registration information may be generated by comparing a detected pattern in first lateral margin 230A and a reference pattern and a second set of registration information may be generated by comparing a detected pattern in second lateral margin 230B and the reference pattern. Any detected difference between the first and second set of registration information may then be used to determine a rotation about said central axis. This rotation may then compensated by applying different corrections to different sets of nozzles along the second printbar.

For simplicity, the examples herein have been described in relation to one or more printbars; however, such examples may be extended to printing systems that have N subsequent printbars, i.e. following the first printbar 160 along the path 145 where N>1, or multipass printing systems with one or more printbars that print multiple images on multiple passes of a print medium. In a sixth variant, each of the Nth subsequent printbars may have an associated Nth detector. For example, an associated Nth detector may be located within a predetermined distance of, or be attached to, an Nth subsequent printbar. In this case, at least one processing unit, which may comprise registration processing unit 170, is arranged to determine a position of the first image relative to the Nth subsequent printbar based on a pattern detected by the associated Nth subsequent detector and the reference pattern. This position is then used to configure nozzle data for the Nth subsequent printbar to locate subsequent images on the print medium based on the position of the first image relative to the Nth subsequent printbar. In a seventh variant, a detected pattern from one or more detectors is used to configure nozzle firing data for a plurality of N subsequent printbars, for example, the pattern detected by detector 180 may be used to configure nozzle firing data for a third printbar. In an eighth variant, data representative of a pattern detected by a plurality of detectors may be used to construct a predicted path of a print medium along the media transport. The predicted path may then be used to configure nozzle data for a plurality of subsequent printbars.

In a ninth variant, the detected pattern may be used in a similar manner to control, e.g. synchronise, the operation of one or more printing accessories. This may be performed instead of or as well as the control of a second printbar. In this variant, a position of the first image relative to the print accessory is determined based on the detected pattern and the reference pattern. A detector may be arranged before the printing accessory. One or more operations of the printing accessory are then configured based on the position of the first image relative to the print accessory. A print accessory may comprise, amongst others one or more of a cutter, a folder, a laminator, and a stapler. There may be multiple printing accessories arranged in parallel and/or series that are controlled in this manner. For example, a cutter may shift a cutting operation based on a determined shift between a first image and the print accessory or a stapler may be controlled to shift a stapling operation.

All the variants described herein and/or component features of those variants may be applied in any combination to any one of the methods and/or systems described herein.

Certain examples described herein have one or more advantages over encoders attached to mechanical elements. For example, position measurement is performed directly based on the printed substrate; this results in more precise data than relying on an indirect measurement of the status of a mechanical element. Said examples further eliminate, or at least minimise, errors due to media expansion, errors due to media slippage, and/or errors due to imperfections in mechanical elements, e.g. roller concentricity, belt thickness or elasticity, etc. Certain examples described herein have one or more advantages over optical media sensor systems. For example, said examples can be used with media transports that do not have useable space under a path of a print medium. Also, said examples may be implemented with existing low-cost detectors, such as a CIS, avoiding the need to develop new image sensors and conferring a clear cost advantage. For example, high-precision imaging devices and optics are not required to provide a reliable and robust registration solution.

Certain examples described herein have an advantage of not requiring modification of a media transport. They also have an advantage of being able to correct registration errors during a printing process, e.g. due to media slippage or expansion during said process. For example, rather than determining an absolute position of a printbar during a calibration phase, certain examples register an image to be printed from a second printbar based on a determined position of a first image in the printing process relative to the second printbar. This corrects for any dynamic errors that occur during transport between one or more printbars and outside of a calibration phase. Moreover, particular examples that use a pseudo-random drop pattern produce a robust registration solution that avoids the need for complex and expensive optical detectors and that can be implemented by reusing existing components in an intelligent manner. Certain examples provide 'real-time' registration compensation during printing and as such detect and correct misalignments that occur during the printing of a document. Misalignments in a variety of directions and with a variety of rotations may be detected and corrected.

At least some aspects of the examples described herein with reference to the drawings may be implemented using computer processes operating in processing systems or processors. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that any control circuitry referred to herein may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least a data processor or processors, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The preceding description has been presented only to illustrate and describe examples of the principles described. This description is not intended to be exhaustive or to limit these principles to any precise form disclosed. Many modifications and variations are possible in light of the above teaching.

The invention claimed is:

1. A method of controlling a printbar in a printing system, comprising:
    generating, with a first printbar at a first position along a path of a print medium, a first image on the print medium, the first image including a reference pattern;
    detecting, at a second position along the path of the print medium, a pattern on the print medium;
    determining a position of the first image relative to a second printbar based on the detected pattern and the reference pattern; and
    configuring nozzle data, for a second image to be generated on the print medium by the second printbar, based on the position of the first image relative to the second printbar.

2. A method according to claim 1, wherein the reference pattern is a pseudo-random dot pattern and determining a relative position of the first image relative to the second printbar comprises:
    correlating the reference pattern with the detected pattern to determine the position of the first image on the print medium relative to the second printbar.

3. A method according to claim 1, wherein generating an image on the print medium comprises:
    printing the reference pattern in one or more lateral margins of an image of a print job.

4. A method according to claim 3, comprising:
    printing the reference pattern in two opposing lateral margins of an image of a print job;
    wherein the step of determining a position of the first image relative to the second printbar comprises:
    determining an angle of rotation of the print medium based on the detected pattern and the reference pattern.

5. A method according to claim 1, wherein the reference pattern is generated based on a nozzle cleaning pattern.

6. A method according to claim 1, comprising:
    determining a position of the first image relative to a print accessory based on the detected pattern and the reference pattern; and
    configuring operation of the printing accessory based on the position of the first image relative to the print accessory.

7. A method according to claim 1, wherein:
    the first printbar and the second printbar are implemented by a single printbar in a multipass printing system; or
    the first printbar and the second printbar are implemented by a two separate printbars in a multiple printbar printing system.

8. A printing device comprising:
    a media transport defining a path of a print medium;
    one or more printbars distributed along the media transport, the one or more printbars being operable to provide:
        a first printbar to print a first image on a print medium, and
        a second printbar to print a second image on a print medium;
    a detector located to detect a pattern printed on a print medium by the first printbar; and
    at least one processing unit to:
        instruct the first printbar to print a reference pattern with the first image;
        determine a position of the first image relative to the second printbar based on the pattern detected by the detector and the reference pattern; and
        configure nozzle data for the second printbar to locate the second image on the print medium based on the position of the first image relative to the second printbar.

9. A printing device according to claim 8, wherein the detector is located before the second printbar along the media transport in a direction of media movement.

10. A printing device according to claim 8, wherein the at least one processing unit comprises:
    a printer image processing unit to instruct the first printbar to print a reference pattern with the first image; and
    a registration data processing unit to receive data representative of the reference pattern from the printer image processing unit and data representative of the pattern from the detector,
    wherein the registration data processing unit is arranged to correlate the data representative of the reference pattern with data representative of the pattern from the detector to determine the position of the first image on the print medium relative to the second printbar.

11. A printing device according to claim 8, wherein the at least one processing unit is arranged to instruct the first printbar to print the reference pattern in one or more lateral margins of an image of a print job.

12. A printing device according to claim 8, wherein the at least one processing unit is arranged to generate the reference pattern based on a nozzle cleaning pattern.

13. A printing device according to claim 8, wherein the printing device comprises a printbar arranged to print both the first image as the first printbar and the second image as the second printbar.

14. A printing device according to claim 8, wherein the printing device comprises a first printbar arranged to print the first image as the first printbar and a second printbar, distinct from the first printbar, arranged to print the second image as the second printbar.

15. A printing device according to claim 8, wherein the detector comprises an image sensor laterally-extending across the wide of the media transport and arranged to capture an image of the print medium.

* * * * *